(12) United States Patent
Hamel et al.

(10) Patent No.: US 10,260,971 B2
(45) Date of Patent: Apr. 16, 2019

(54) REMOTELY POWERED AND REMOTELY INTERROGATED TORQUE MEASUREMENT DEVICES, SYSTEMS, AND METHODS

(71) Applicant: LORD Corporation, Cary, NC (US)

(72) Inventors: Michael Hamel, Essex Junction, VT (US); Daniel O'Neil, St Albans, VT (US); Harrison Sprague, Whitefield, NH (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/325,828

(22) PCT Filed: Jul. 24, 2015

(86) PCT No.: PCT/US2015/041892
§ 371 (c)(1),
(2) Date: Jan. 12, 2017

(87) PCT Pub. No.: WO2016/014891
PCT Pub. Date: Jan. 28, 2016

(65) Prior Publication Data
US 2017/0160152 A1    Jun. 8, 2017

Related U.S. Application Data

(60) Provisional application No. 62/028,894, filed on Jul. 25, 2014.

(51) Int. Cl.
*G01L 3/00* (2006.01)
*G01L 3/10* (2006.01)
*G01L 1/22* (2006.01)

(52) U.S. Cl.
CPC .............. *G01L 3/108* (2013.01); *G01L 1/225* (2013.01)

(58) Field of Classification Search
CPC ................................ G01L 1/225; G01L 3/108
USPC ..................................................... 73/862.08
See application file for complete search history.

(56) References Cited

U.S. PATENT DOCUMENTS

| | | | | |
|---|---|---|---|---|
| 3,757,580 A * | 9/1973 | Crocker | ................. | G01L 1/225 73/773 |
| 5,062,062 A * | 10/1991 | Nishibe | ................. | G01D 3/022 702/41 |
| 5,898,598 A * | 4/1999 | Szwast | .................... | B25B 23/14 173/176 |
| 2006/0207347 A1* | 9/2006 | Kreuzer | ................. | G01L 3/108 73/862.325 |

FOREIGN PATENT DOCUMENTS

| | | |
|---|---|---|
| DE | 40 25 279 A1 | 2/1992 |
| DE | 19962596 | 7/2001 |
| GB | 1510126 | 5/1978 |
| WO | 2005/098383 A1 | 10/2005 |

* cited by examiner

*Primary Examiner* — Max H Noori (57) ABSTRACT

Torque measurement devices, systems, and methods are provided. Exemplary torque measurement devices, systems, and methods include providing rotating electronics and non-rotating electronics configured for remote power transmission and remote interrogation via near field and switched reactance communications. The rotating electronics and the non-rotating electronics can communicate analog information without batteries or a physical connection therebetween.

29 Claims, 5 Drawing Sheets

REMOTELY POWERED AND REMOTELY INTERROGATED TORQUE MEASUREMENT DEVICES, SYSTEMS, AND METHODS

CROSS-REFERENCE TO RELATED APPLICATIONS

This application is a 371 application of International Application No. PCT/US15/41892 filed on Jul. 24, 2015, which claims the benefit of U.S. Provisional Patent Application No. 62/028,894, filed on Jul. 25, 2014, the disclosure of which is incorporated by reference herein.

TECHNICAL FIELD

The subject matter herein generally relates to the field of torque measurement devices, systems, and methods, and more particularly to remotely powered, and remotely interrogated, wideband torque measurement devices, systems, and methods.

BACKGROUND

Acquiring torque measurements on rotating equipment at high revolution rates may expose rotating electronic components to massive centrifugal forces. For example, a 4 inch (10.16 cm) diameter shaft rotating at 9600 revolutions per minute (RPM) has 5200 gravitational forces (also referred to as G-forces or Gs) at the surface of the shaft. As electronics are mounted above the shaft surface, the forces increase exponentially with an increasing radius of rotation. For example, electronics weighing 10 grams, mounted 1 inch above the surface of the example shaft will be exposed to 7850 Gs, and 173 lbs (about 769.5 N) of centrifugal force. Centrifugal forces are problematic and limit the life and/or tolerance of circuit components or elements.

Limiting factors for tolerance of such forces in traditional electronic circuits typically include utilizing timing control circuits with crystals, and any other non-solid state components such as electrolytic capacitors containing liquids, and micro-electro-mechanical (MEMs) devices. Modern solid dielectric capacitors may easily be substituted for electrolytic types in circuits where high centrifugal forces are anticipated. However, using digital and embedded systems electronics is more difficult without crystals.

Resistor-capacitor (RC) oscillators are unaffected by centrifugal forces. In some conventional devices and systems, RC oscillators are utilized in high-G digital circuits where precise timing, normally critical for communications, is not needed due to use of clocked synchronous data encoding formats. Even though RC oscillators drift much more with temperature than crystal controlled oscillators, synchronous data encoding formats that multiplex the data rate clock with the data stream are tolerant of much more drift than is typical of RC timing control. A problem occurs, however, when precise timing is needed and must be maintained.

For example, with the onset of Voltage to Frequency Converter (VFC) type analog systems, precise timing must be maintained for accuracy of the information being converted to the frequency domain. Analog systems are desirable in applications where simplicity and high bandwidth are required and in high reliability and safety critical applications where the complexity of software and firmware must be scrutinized to Design Assurance standards, such as DO-178.

Accordingly, a need exists for remotely powered and remotely interrogated torque measurement systems, devices, and/or methods that may be implemented entirely in the analog domain.

SUMMARY

Remotely powered and remotely interrogated wideband torque measurement devices, systems, and related methods are disclosed herein that are implemented entirely in the analog domain. Devices, systems, and methods herein include analog sensors, such as strain gauges and/or strain bridges as well as analog devices for DC voltage output on the non-rotating side.

An exemplary embodiment of a torque measurement device includes a strain sensor configured to output a voltage signal that is proportional to a measured or detected strain, a Voltage to Frequency Converter (VFC) in electrical communication with the strain sensor, and a coil. The VFC is configured to receive the voltage signal from the strain sensor, and convert the voltage signal into a frequency signal that is proportional to the strain. The coil includes a rotating receiver coil, which is inductively coupled to a remotely located non-rotating electrical component, and configured to power the strain sensor via power received from the non-rotating electrical component and transmit the frequency signal to the non-rotating electrical component without physically contacting the non-rotating electrical component.

An exemplary embodiment of a torque measurement system comprises rotating electronics and non-rotating electronics. The rotating electronics include at least one sensor for measuring a strain, and a VFC configured to output a frequency signal that is proportional to the measured strain. The non-rotating electronics are remotely located from the rotating electronics and configured to remotely power and remotely interrogate the rotating electronics via near field and switched reactance communications. The rotating electronics and the non-rotating electronics are configured to communicate analog information without batteries or a physical connection therebetween.

An exemplary embodiment of a torque measurement method comprises: providing a strain sensor on or over a rotating component for outputting a voltage signal that is proportional to a strain. The method further includes electrically connecting a VFC to the strain sensor, as the VFC is configured to receive the voltage signal and convert the voltage signal into a frequency signal that is proportional to the strain. The method further includes providing a rotating coil in electrical communication with the VFC and inductively coupling the rotating coil to a remotely located, non-rotating coil for remotely powering the strain sensor and receiving frequency signals transmitted from the rotating coil, without any contact (e.g., physical or mechanical contact) between the rotating coil and the non-rotating coil.

Torque measurement devices, systems, and methods herein are configured to measure torque associated with components or structures that rotate at approximately 9,000 revolutions per minute (RPM) or more, approximately 10,000 RPM or more, or approximately 12,000 RPM or more. Devices, systems, and methods herein are also operable in high G-force applications, for example, at approximately 5,000 G-forces (Gs) or more, approximately 7,500 Gs or more, or approximately 10,000 Gs or more.

In some embodiments, the strain sensor provided in torque measurement devices and/or systems herein includes a strain gauge rosette or a Wheatstone bridge.

In some embodiments, the torque measurement devices and/or systems provided herein are configured to attach to and/or measure torque associated with an aircraft component, a helicopter component, an engine component, a rotor, a shaft, or a turbine component.

In some embodiments, torque measurement devices and/or systems provided herein are devoid of software or firmware. In some embodiments, torque measurement devices and/or systems further comprise an onboard calibrator, an amplifier, a power supply, and/or a controlled clock source.

In some embodiments, torque measurement devices and/or systems provided herein comprise a measurement bandwidth that is approximately 50 kHz or more. Devices and/or systems provided herein are operable at temperatures of between approximately −55° C. and 125° C.

Minimizing the number of components and circuit complexity directly translates to increased reliability. Additionally, implementing torque measurement functionality entirely in the analog domain and therefore not requiring any firmware development, increases value proposition by lowering development costs and shortening time to market, relative to a digital system requiring DO-178 software design assurance scrutiny.

Numerous objects and advantages of the subject matter will become apparent as the following detailed description of the preferred embodiments is read in conjunction with the drawings, which illustrate such embodiments.

DETAILED DESCRIPTION

Figures (also "FIGS.") 1 to 4 illustrate various aspects, views, and/or features associated with torque measurement devices, systems, and methods that operate entirely in the analog domain, thereby avoiding problems that occur when digital circuitry components are subjected to centrifugal forces. Devices, systems, and methods herein are also configured to maintain high precision timing without the use of a clock on the rotating side. Devices, systems, and methods herein are configured to measure torque associated with high revolution components or structures that rotate at approximately 9,000 revolutions per minute (RPM) or more, approximately 10,000 RPM or more, or approximately 12,000 RPM or more. Devices, systems, and methods herein are also operable in high G-forces applications, for example, at approximately 5,000 G-forces (Gs) or more, approximately 7,500 Gs or more, or approximately 10,000 Gs or more.

The subject matter herein preserves the advantages associated with not requiring the use of a crystal on rotating electronics, while maintaining the precise timing required for Voltage to Frequency Converter (VFC) type analog operation. In some aspects, by incorporating VFC analog technology in place of microcontroller and/or other digital elements used in the commonly owned and assigned U.S. Pat. No. 7,256,695, which is incorporated herein by reference in the entirety, and in particular FIG. 2a, reference item 54, FIG. 13, reference item 302, Col. 5, line 33—Col. 6, line 5, and Col. 13, lines 41-51 of U.S. Pat. No. 7,256,695. U.S. Pat. No. 7,256,695 describes remotely powered, remotely interrogated digital telemetry system, a high bandwidth and more mechanically robust system is realized. Specifically, digital hardware (e.g., including the microcontroller, memory and A/D converter) in the rotating electronics may be replaced with analog devices, for example, that meet military standards described in AD652S/883B in regards to a MIL-Spec VFC.

Devices, systems, and methods herein include "non-contact" devices for non-contact torque sensing and power transmission. The term "non-contact" indicates that there is no mechanical or physical connection between the rotating and non-rotating electronics, components, or assemblies described herein, thus providing for more robust non-contact torque measurement devices and systems. Devices, systems, and methods described herein utilize a small, light, and balanced electronic package disposed on or over a rotating structure, or any other rotating component, such that data and/or power may be transmitted to the non-rotating portion without the need for physical or mechanical contact. Near field communications (NFC) and contactless power transmission via switched reactance are utilized.

As used herein the term "strain sensor" refers to a strain bridge or strain gauge and is not limited in any aspect other than being capable of determining a strain from a rotating component or structure.

Figure 1:
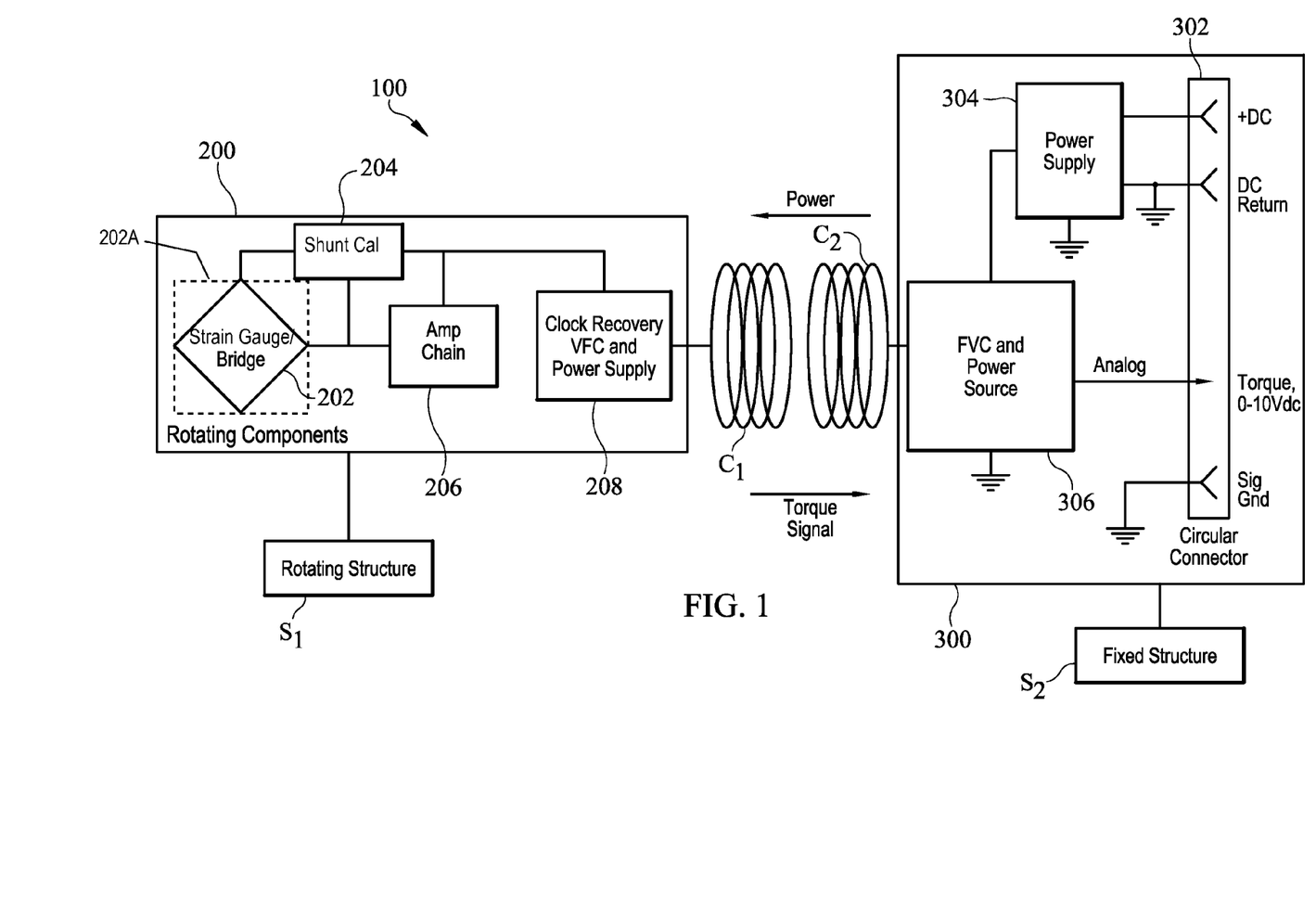
FIG. 1 is a schematic block diagram of a torque measurement system including rotating and non-rotating torque measurement devices according to one embodiment.

FIG. 1 is a schematic block diagram of a torque measurement system generally designated 100 that includes one or more torque measurement devices according to one embodiment. Referring to FIG. 1, system 100 includes a rotating torque measurement device including one or more rotating electronics 200 (also referred to as rotating assemblies or rotating components) and a non-rotating torque measurement device including one or more non-rotating electronics 300 (also referred to as non-rotating assemblies or non-rotating components). Rotating electronics 200 are disposed on or over a rotating structure $S_1$ or a portion thereof, for example, a shaft, a motor, a rotor, a mast, a rod, a fan, a bar, a gear, etc. Rotating electronics 200 do not mechanically and/or physically contact or connect to non-rotating electronics 300. Non-rotating electronics 300 may be disposed at a location that is remote from rotating electronics 200 for remotely interrogating and remotely powering rotating electronics 200, thereby providing for an inexpensive but precise torque measurement system 100 that is operable entirely in the analog domain. In some embodiments, non-rotating electronics 300 are fixedly disposed over a fixed structure $S_2$ or component, such as a frame member, a support beam, a fixed substrate, a support structure, or a wall.

Rotating electronics 200 may be disposed on or over a rotating structure (e.g., a shaft, a rotor, a motor, a fan, a gear, or the like) or machinery including at least one strain measuring sensor or device, such as a strain gauge or bridge 202, at least one calibrating device, such as a shunt calibrator 204, an amplifier chain 206, and a VFC 208 having clock recovery and power supply capabilities. Strain bridge 202 includes a strain sensor configured to convert torque into an electrical signal (e.g., a voltage) usable by VFC 208. Strain bridge 202 may be provided within an optional housing 202A or carrier body for physical, mechanical, and/or environmental protection thereof. Housing 202A is shown in broken lines for illustration purposes only, as provision thereof is optional. VFC 208 may convert an electrical signal (e.g., voltage) that is output from strain bridge 202 into a frequency, which may then be output therefrom and converted back into an electrical signal by a component of non-rotating electronics 300, namely by an analog Frequency to Voltage Converter (FVC) 306.

VFC 208 includes an analog device configured to maintain precise timing and accuracy of voltage measurements being converted to the frequency domain. Rotating electronics 200 receive contactless power, frequency, and/or timing information from remotely disposed non-rotating electronics 300. Rotating electronics 200 are configured to transmit or send a torque signal (e.g., a VFC frequency) to the remote, non-rotating electronics 300, where the torque signal includes VFC strain information that may subsequently be converted into a torque value via non-rotating electronics 300.

Regarding calibration, and to achieve a measurement accuracy of about 0.1% of full scale, a pre-installation calibration process based on existing calibration methods may be performed. Each instrumented shaft may undergo a full range of torque/speed combinations. This battery of tests may optionally be repeated at about 20° C. increments across the range of operational temperature, typically about −54° C. to 71° C. Calibration via a shunt calibrator 204 may compensate for variations in shaft geometry, strain gauge alignment and in shaft stiffness due to temperature. Shunt calibration may be used to verify the output of a strain bridge 202 relative to a predetermined mechanical input or strain.

A sensor for measuring torque may include a strain gauge or string bridge 202, such as a Wheatstone bridge circuit or a strain gauge rosette. Output of a torque specific strain bridge 202 is represented by the following equation:

$$\tau_{xy} = \frac{E * \varepsilon_{IND}}{4(1-v)} \qquad \text{EQ. (1)}$$

Where shear stress ($\tau_{xy}$) is dependent on the substrate modulus of elasticity (E), the strain bridge output ($\varepsilon_{IND}$) and Poisson's ratio (v). Signal error and noise, either induced via extraneous excitation or internal to system electronics may be minimized through several different installation practices. Strain bridge 202 is configured to measure small changes in electrical resistance proportional to compression and tension. The output of strain bridge 202 may be relatively small. Thus, a strain bridge amplifier such as an amplifier chain 206 is configured to boost the signal level to increase resolution and improve signal-to-noise ratios.

In some embodiments, strain bridge 202 includes a full bridge rosette utilized for aircraft applications, which may be bonded to a rotor mast while ensuring exact 180° opposed gauges. Precisely installed gauges eliminate signal imbalance between opposite sides of the bridge rosette, which potentially contribute to output signal noise. Where possible, wiring is shielded with an electrically insulating material or covering to reduce electromagnetic coupling with undesirable sources.

In other embodiments, strain bridge 202 includes a Wheatstone bridge type of strain measuring sensor. The premise of a Wheatstone bridge is to capture very small voltage differentials as inflicted by strain influence on the surface mounted strain bridge 202. Wheatstone bridges may be configured several ways to cancel out specific loading effects; in one embodiment, the gauges are configured to cancel electrical excitation as caused by shaft bending loads, axial loads, and temperature effects as caused by material susceptibility to thermal expansion. Apparent to those skilled in the art, this is accomplished via gauge orientation and opposing placement on the drive shaft. This gauge positioning causes a voltage differential when shear stress due to torsion is imparted on the shaft. In this embodiment, bending, axial loads, and temperature changes do not cause a bridge unbalance and therefore the bridge voltage output is zero (0).

VFC 208 can receive the analog voltage output of the strain gauge rosette or strain bridge 202 and send it across an inductive link to the fixed frame, non-rotating electronics 300. In some embodiments, the inductive link between rotating electronics 200 and non-rotating electronics 300 includes a first coil $C_1$ that is inductively coupled to a second coil $C_2$. First coil $C_1$ is associated with rotating electronics 200 and second coil $C_2$ is associated with non-rotating electronics 300. Data on the fixed side (e.g., non-rotating side, 300) may be filtered onboard (factory adjustable), and output as a 0-10V analog signal via, for example, a circular connector 302 and output to a customer system (not shown). In an exemplary embodiment, circular connector 302 includes a MIL-DTL-38999 Series III device connected to a power supply 304 and a customer system (not shown). Due to the direct connections between the non-rotating mechanical substrate and the sensing system coupled with high-speed electronics and efficient algorithms, system latency is held at or below about 2 milliseconds, making it ideal for near real-time applications. In some aspects, latency at or below about 20 microseconds is expected.

In some aspects, accuracy results indicate a about 0.1% of full scale with excellent data resolution. Allowing for 150% of nominal torque, resolution of the system would be about 2.54 mV/ft-lb. Torque measurement via strain gauge voltage differential is a linear system, i.e., output changes linearly with respect to torque loading. This linearity correlates to consistent system measurement accuracy across the full range of torque loading scenarios.

Still referring to FIG. 1 and in some embodiments, first coil $C_1$ includes a rotating receiver coil, and second coil $C_2$ includes a fixed excitation coil. The torque signal (e.g., a VFC frequency signal) received on the excitation coil $C_2$ is demodulated and the received demodulated VFC signal is applied to a FVC 306 that includes a power source. Connector 302 outputs an analog torque signal as an output voltage (in VDC) to a customer system (not shown). In some aspects, first and second coils $C_1$ and $C_2$, respectively, may be optionally split for ensuring VFC signal coupling for an entire 360° of rotation.

Figure 2A:
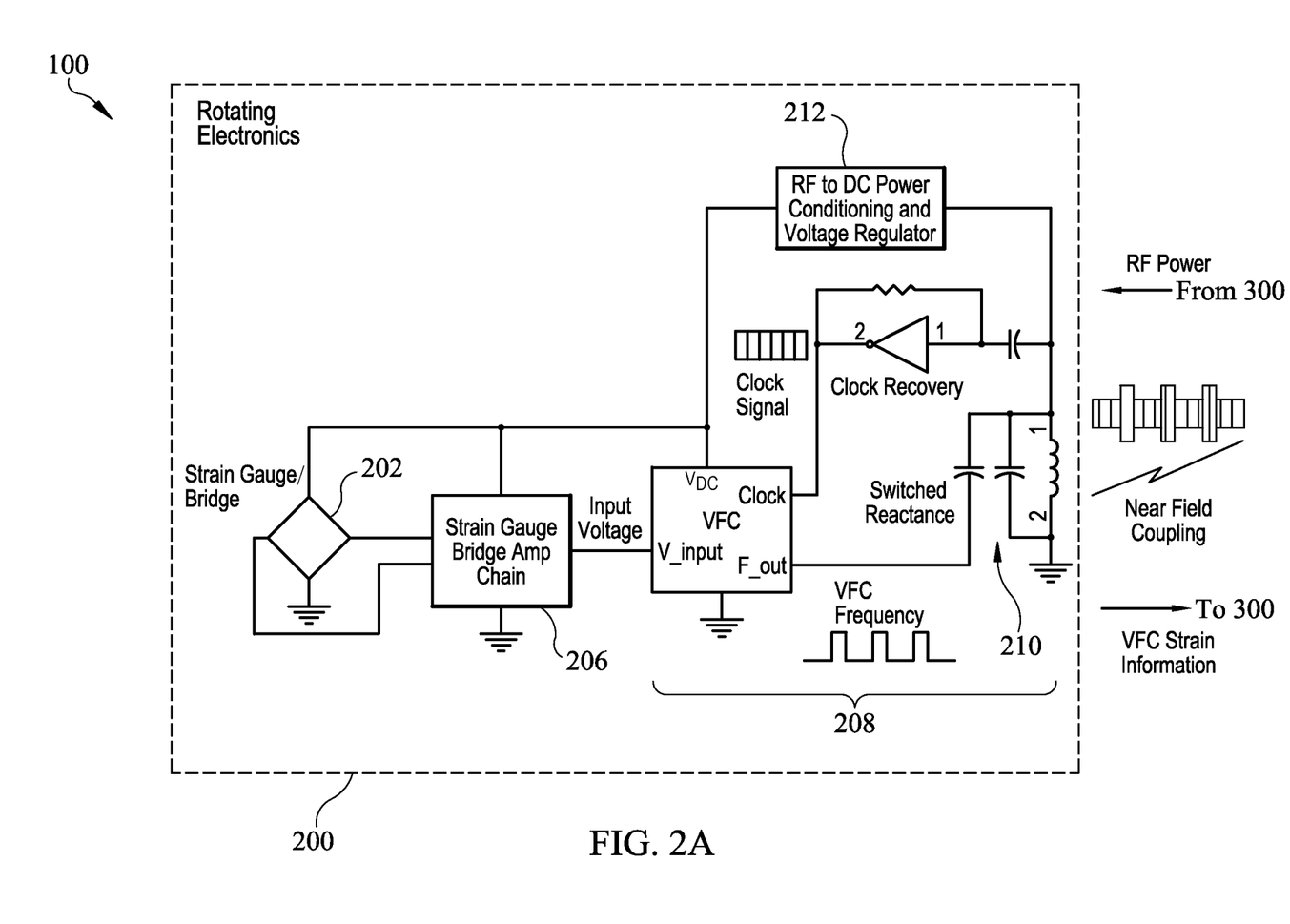
FIGS. 2A and 2B are more detailed schematic block diagrams of a torque measurement system including rotating and non-rotating torque measurement devices according to one embodiment.
Figure 2B:
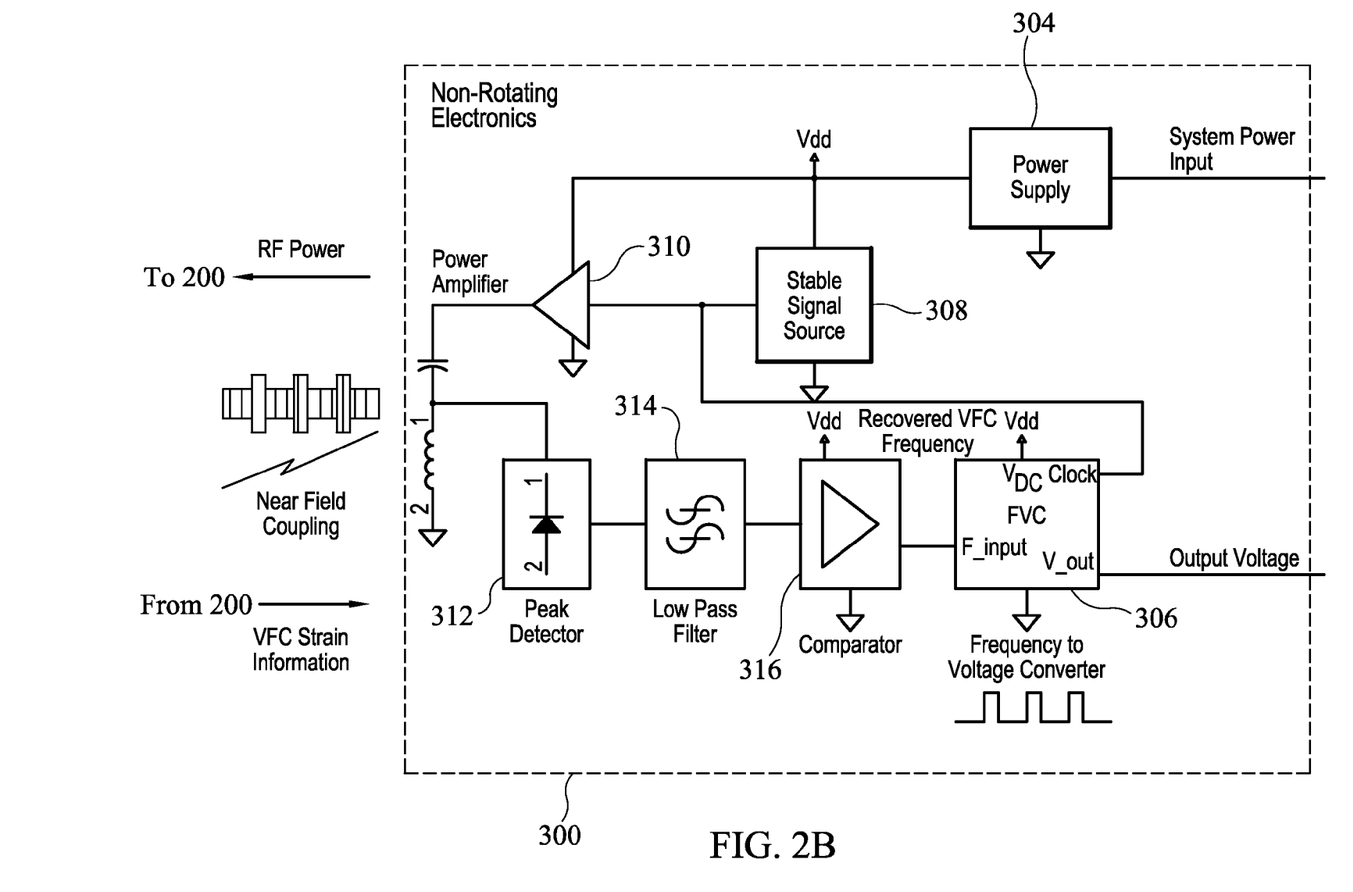

FIGS. 2A and 2B are more detailed views of aspects of FIG. 1. FIG. 2A illustrates additional aspects of rotating electronics 200 disposed on or over a rotating structure (e.g., $S_1$, FIG. 1) and FIG. 2B illustrates fixed, non-rotating electronics 300 disposed on or over a fixed structure (e.g., $S_2$, FIG. 1). Rotating electronics 200 are inductively coupled to non-rotating electronics 300 for providing contactless power and signal transmission therebetween via NFC and switch reactance circuitry components.

The need for precise timing required by VFC 208 and rotating electronics 200 is addressed by extracting the frequency from the received excitation power signal and applying it to a clock input of the VFC 208 as illustrated in FIGS. 2A and 2B. In this way, VFC 208, or portions thereof, may be exposed to very high Gs and still utilize the timing precision and stability provided by a stable signal source 308

(FIG. 2B) derived from non-rotating electronics 300. In some embodiments, the stable signal source 308 includes an oscillator that may be, but does not have to be a crystal controlled clock source. That is in some embodiments rotating electronics 200 and circuitry are devoid of a crystal controlled clock source but advantageously utilize a controlled clock source associated with non-rotating electronics 300.

Exemplary specifications of system 100 are listed in Table 1 below.

TABLE 1

| | |
|---|---|
| Linearity Error: | 0.05% max |
| Gain Error: | 1% max |
| Measurement Bandwidth (BW): | 50 kHz or more |
| Operating Temp: | −55 C. to +125 C. |
| Communication Type: | NFC-VFC |
| Communication Frequency: | 4.00 MHz typical |
| Operating Current: | 150 mA |

Referring to FIG. 2A, strain gauge sensors, bridges, and amplifiers (e.g., 202, 206) of rotating electronics 200 are powered from direct current (DC) derived from an excitation coil or antenna (e.g., $C_2$, FIG. 1) coupled to an AC electromagnetic (EM) excitation field located remotely with non-rotating electronics 300. The power receive or receiver coil (e.g., $C_1$, FIG. 1) may be positioned so that inductive coupling is maintained over the entire rotation of the shaft or structure it is mounted on, allowing for measurements at zero (0) RPM independent of a rotation rate. Strain gauges or sensors (e.g., 202) may include a torque sensing Wheatstone bridge circuit that transmits power and data via near field technology to non-rotating electronics 300, in some aspects via VFC 208 and power systems, such as a switched reactance 210 system or circuitry.

Rotating electronics 200 may include strain sensor (e.g., bridge 202), amplifier (e.g., 206), and VFC power system 208. Rotating electronics 200 may further include an RF to DC power conditioning and voltage regulator 212 circuitry or components for use in converting RF signal received from non-rotating electronics 300 into DC power and voltages (e.g., VFC) usable by strain bridge 202 and VFC 208. Strain bridge 208 is configured to measure torque by converting rotating strain measurements (e.g., resistance) into electrical signals, such as voltage signals. VFC 208 is configured to convert the voltage signals into frequency signals which may be converted back into voltage signals (e.g., via FVC, FIG. 2B) indicative of a measured torque. Strain gage-based signal conditioners such as the RF to DC conditioning and voltage regulator 212 can provide a constant voltage source to power strain bridge 202 and detect torque.

Referring to FIG. 2B, non-rotating electronics 300 may include a power supply 304 configured to supply power to a stable signal source 308, such as a stable clock source. A power amplifier 310 is used to contactlessly (e.g., inductively) transmit RF power and clock information from power supply 304 and signal source 308, respectively, to rotating electronics 200.

In applications where it may be desirable to retrofit a torque measurement system 100 over a rotating shaft without disassembling the shaft (e.g., or other rotating component) to be monitored, the rotating receive coil (e.g., $C_1$, FIG. 1) of system 100 may optionally be split into two coils, each mounted on a carrier assembly occupying half of the circumference of the shaft. The two carrier assemblies may be bolted together on the shaft in situ without disconnecting the shaft. The coils from each carrier assembly half may be electrically connected in series with an environmentally sealed connector. Mounting the carrier assemblies in this manner necessitates a gap in the rotating coil visibility to the fixed excitation coil (e.g., $C_2$, FIG. 1) over a small portion of shaft rotation. This may be mitigated by also splitting the fixed excitation coil (e.g., $C_2$) into two series connected coils and positioning them so that at least one excitation coil is always coupled with at least one rotating receive coil. This split coil method is optional, but one method of ensuring power and VFC signal coupling throughout the entire 360° of shaft rotation. Splitting the rotating coil for the sensor in each half of a clam shell style device, also allows the torque measurement device (e.g., non-rotating portion, 200) to receive power, even at 0 speed (i.e., 0 RPM).

For improved power transfer efficiency between the fixed excitation coil (e.g., $C_2$, FIG. 1) and the rotating pickup coil or antenna (e.g., $C_1$, FIG. 1), the rotating coil or antenna is electrically resonant at the frequency of the EM excitation field. Strain bridge 202 and respective amplifiers 206 output a DC voltage proportional to strain. Amplifier 206 gain is set according to measurement requirements for strain per volt sensitivity. The amplified analog voltage proportional to sensor value is converted to a frequency in VFC 208. VFC 208 includes an integrated circuit (IC) and/or circuitry device having one or more inputs and outputs. The range of frequency output over the range input voltage may be set according to resolution requirements.

VFC 208 may be powered by DC derived from the received EM excitation field. One aspect of the instant subject matter is the ability to use ratiometric conversion. The DC sensor bridge 202 excitation is also the reference for the VFC 208 conversion, which has the advantage of enabling stable measurements when the DC sensor bridge 202 excitation voltage varies.

In some embodiments, the frequency output from VFC 208 is proportional to a strain value measured via strain sensor (i.e., strain bridge 202) and is used to shift the resonance of the rotating receive coil/antenna (e.g., $C_1$, FIG. 1A) using a switched reactance components 210, such as a capacitor or other coil at a rate determined by VFC 208, and ultimately the strain that is measured. Switched reactance components 210 cause the receive coil (e.g., $C_1$, FIG. 1) electrical resonant frequency to change at a rate in accordance with the VFC 208 frequency. In turn, this shift of resonant frequency at the VFC rate in the rotating coil (e.g., $C_1$, FIG. 1) modulates the amplitude of the power signal on the fixed excitation coil (e.g., $C_2$, FIG. 1), resulting in amplitude modulation (AM). The AM signal on the excitation coil may be demodulated and the received demodulated VFC signal applied to FVC 306, converting the VFC frequency generated on the rotating electronics 200 back to an analog DC value in the fixed, non-rotating electronics 300. In this way, analog information (e.g., VFC strain information such as frequency) is conveyed over an air gap without batteries or a physical connection, and precise timing is maintained without centrifugal forces influencing the accuracy of the VFC 208 frequency. Switched reactance components 210 have an advantage as they obviate the need for an onboard power supply, and receive all of their power for operation from power transmitted to them by an external (i.e., remote) component or reader.

Still referring to FIG. 2B and in some embodiments, VFC strain information is received by a peak detector 312 on the fixed side of non-rotating electronics 300 and may be filtered using a low pass filter 314. A comparator 316 may received the filtered VFC strain information and provide it in a form usable by FVC 306. FVC 306 may output an electrical signal indicative of the measured torque to a customer system (not shown). The electrical signal output by FVC 306 may include an output voltage indicative of an amount of resistance, or torque experienced by a rotating structure (e.g., $S_1$, FIG. 1). Torque measurements may be used for any suitable application, such as vibration control, vibration reduction, or the like.

As persons of skill in the art will appreciate, FIGS. 1 to 2B are exemplary aspects of torque measurement systems and/or devices. Torque measurement systems and devices are not limited to the exact structures or configurations illustrated by FIGS. 1 to 2B. Portions of torque measurement systems, devices, and/or functionalities thereof, may be integrated, separated, and/or co-located with other portions of torque measurement devices and/or systems via electrical connections in configurations other than that shown. Each figure is for exemplary purposes only, and is not limited in any respect.

Figure 3:
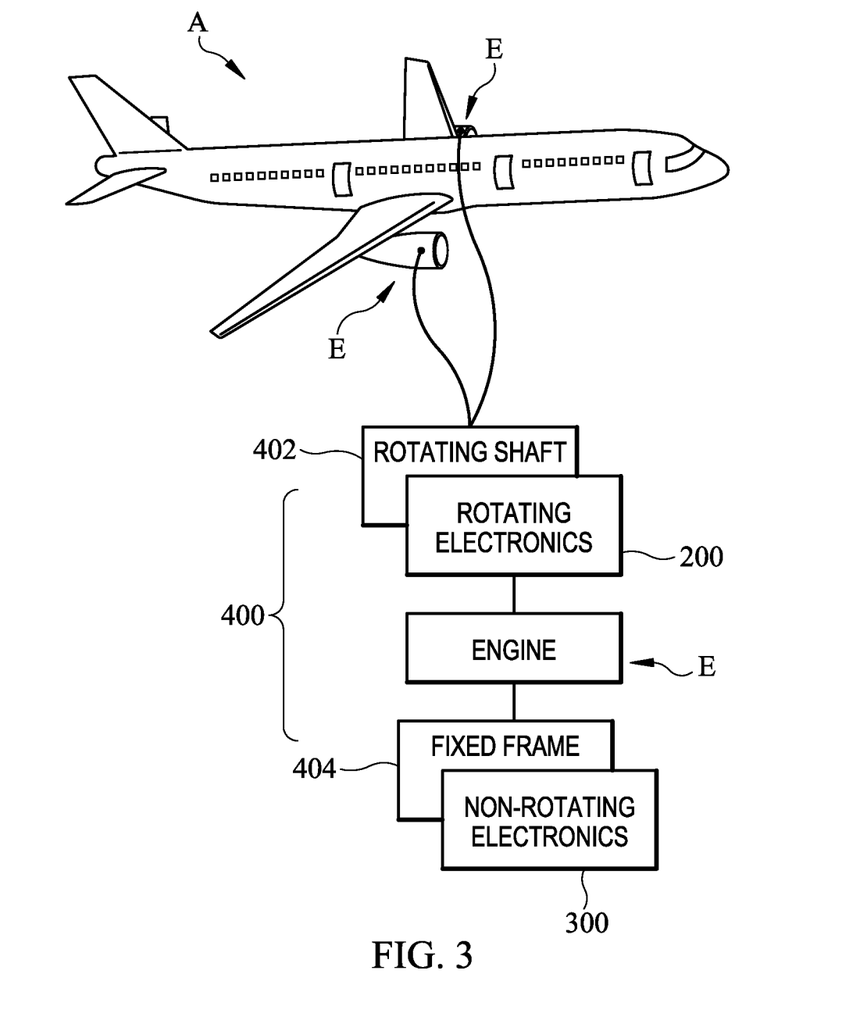
FIG. 3 is a schematic block diagram of an aircraft incorporating an exemplary torque measurement system according to one embodiment.

FIG. 3 is a schematic block diagram of an aircraft A incorporating an exemplary torque measurement system 400 proximate each engine E according to one embodiment. FIG. 3 is one exemplary embodiment of a torque measuring system 400, for example, for use in aircraft A, which may utilize two sets of sensors (e.g., strain gauges or strain bridges), one for each engine E output shaft. Each set of torque sensors includes a rotating frame package comprising rotating electronics 200 and a fixed frame package comprising non-rotating electronics 300. The fixed (non-rotating) electronics 300 are attached to a stable structure alongside the engine output shaft. In some aspects, the stable structure includes a fixed frame 404 or fixed frame component (e.g., a fixed beam, strut, or the like). Rotating electronics 200 may attach directly to each rotating engine shaft 204. Rotating electronics 200 communicate with fixed frame electronics 300 via a non-contact inductive couple, obviating the need for mechanical slip rings, batteries, and/or complex wired connections.

In some embodiments, the analog output from rotating electronics 200 may be converted by the fixed electronics 300 into ft-lbs (Nm) of torque. System 400 may include at least one sensor (e.g., 202, FIG. 1) per shaft 402 to be monitored. Sensor (e.g., 202, FIG. 1) can comprise a Wheatstone bridge or a strain gauge rosette. In some aspects, 28 VDC aircraft power conditioning and conversion is input to the low voltage internal supplies of rotating electronics 200. Devices and systems herein may provide anywhere from about 0V to about 10V of analog output directly correlated to shaft torque.

By installing electronics 200 including a strain gauge on a rotating substrate or shaft 402 and continually measuring bridge voltage differential, it is possible to correlate system torque to the output voltage of the strain bridge (e.g., 202, FIG. 1A). This results in a novel non-contact form of inductive powering and data transfer.

Still referring to the exemplary embodiment of a torque measuring system 400 for aircraft, strain gauge sensors may be mounted on shaft 402 and oriented so that they respond to torque and have minimal response to bending forces. Electronics 200 containing signal conditioning for the torque sensors (e.g., 202, FIG. 1) can be mounted on the shaft using a carrier or housing (e.g., 202A, FIG. 1) that physically covers the torque sensor and provides environmental protection for the torque sensing strain gauges. This carrier and the electronics 200 disposed within are designed to withstand the centrifugal forces associated with very high-speed rotation, without introducing balance issues.

The torque sensor (e.g., 202, FIG. 1) portions of electronics 200 may receive 28 VDC power from the host system (e.g., aircraft A system). Both power and torque measurements may be transferred across and/or between the rotating electronics 200 to non-rotating electronics 300 air gap using inductive coupling and switched reactance communications. The rotating electronics 200 contain one or more coils (e.g., $C_1$, FIG. 1) that are electromagnetically coupled to a nearby stationary coil (e.g., $C_2$, FIG. 1) on the non-rotating side. The non-rotating excitation coil (e.g., $C_2$, FIG. 1) may be driven by an AC high frequency signal of sufficient strength to power rotating electronics 200. The rotating coil (e.g., $C_1$, FIG. 1) or coils are tuned to the high frequency signal emanating from the stationary coil for converting the AC to DC for power.

Torque measurements are then encoded into a second signal in rotating electronics 200 and communicated to the non-rotating electronics 300 by switched reactance. The pick-up coil(s) (e.g., $C_1$, FIG. 1) on the rotating assembly are normally tuned to resonance at the AC power frequency. To transfer information, the electrical resonant frequency of the pick-up coil(s) is switched between two different states in accordance with the encoded torque signal. This in turn modulates the loading on the stationary excitation coil (e.g., $C_2$, FIG. 1) causing amplitude modulation (AM) on the stationary coil AC signal. This AM is demodulated and converted back to torque values in the stationary electronics 300, and formatted for delivery to the aircraft A system using the torque information. This switched reactance method of communications is capable of supporting both analog and digital encoding of sensor measurements.

Improved features include for example and without limitation, inter alia: obviating the need for firmware or software; improving tolerance to extreme acceleration forces while remaining operational and accurate; maintaining precision timing without crystals on rotating electronics; retrofitting to existing applications without disassembly of the application; operability at zero rotation rate and at any rotational position; providing environmental protection to sensors, which are housed in covers (e.g., strain gauges are covered); improving the geometry of pick-up coils provides a low profile housing; ratiometric reference in V-F Conversion; complying with MIL-STD-810 and 461 testing.

Any suitable size of torque measurement devices and/or systems described herein may be provided. In one embodiment, exemplary sizes or dimensions of a torque monitoring system 400 (per rotating engine shaft, 402) is approximately 4.25 inches×3.5 inches (about 10.8 cm×8.9 cm) long for the rotating component (i.e., 200 including the measurement device structure, board, and/or coils) and approximately 2 inches×3 inches×3 inches (about 5.1 cm×7.6 cm×7.6 cm) for the fixed, non-rotating electronics 300 package. Reducing clearances to approximately 0.25 inches (about 0.6 cm) between the fixed and rotating transmitter coils improves the non-contact communications and power transfer between the rotating/non-rotating frames. However, any size, shape, and/or clearance dimension of devices, systems, and/or components thereof is contemplated.

In some aspects, a low overall system weight is desired. For example, a system weighing approximately 4 lbs (about 1.8 kg) or less is desirable; however, any weight is contemplated. In some aspects, the rotating components may weigh approximately 2 lbs (about 0.9 kg), and the fixed components may weight approximately 1.6 lbs (about 0.7 kg).

In some aspects, all electrical connections (e.g., of 200, 300) are made with MIL-Spec wire/cable. A MIL-DTL-38999 Series III environmentally rated connector may be used at the electronics housing to integrate devices/systems herein with a system to be monitored/measured, including but not limited to an aircraft avionics system. The electronics housing may include aluminum and be configured for mounting to rigid aircraft structure as part of the fixed frame package.

FIG. 3 is for exemplary purposes only, and is not limited in any respect as will be appreciated by those in the art. Torque measurement systems and devices are not limited to the exact structures or configurations illustrated. Portions of torque measurement system 400, electronics 200, 300 and/or the functionalities thereof, may be integrated, separated, and/or co-located with other portions of the aircraft A or engine E in configurations other than that shown.

Figure 4:
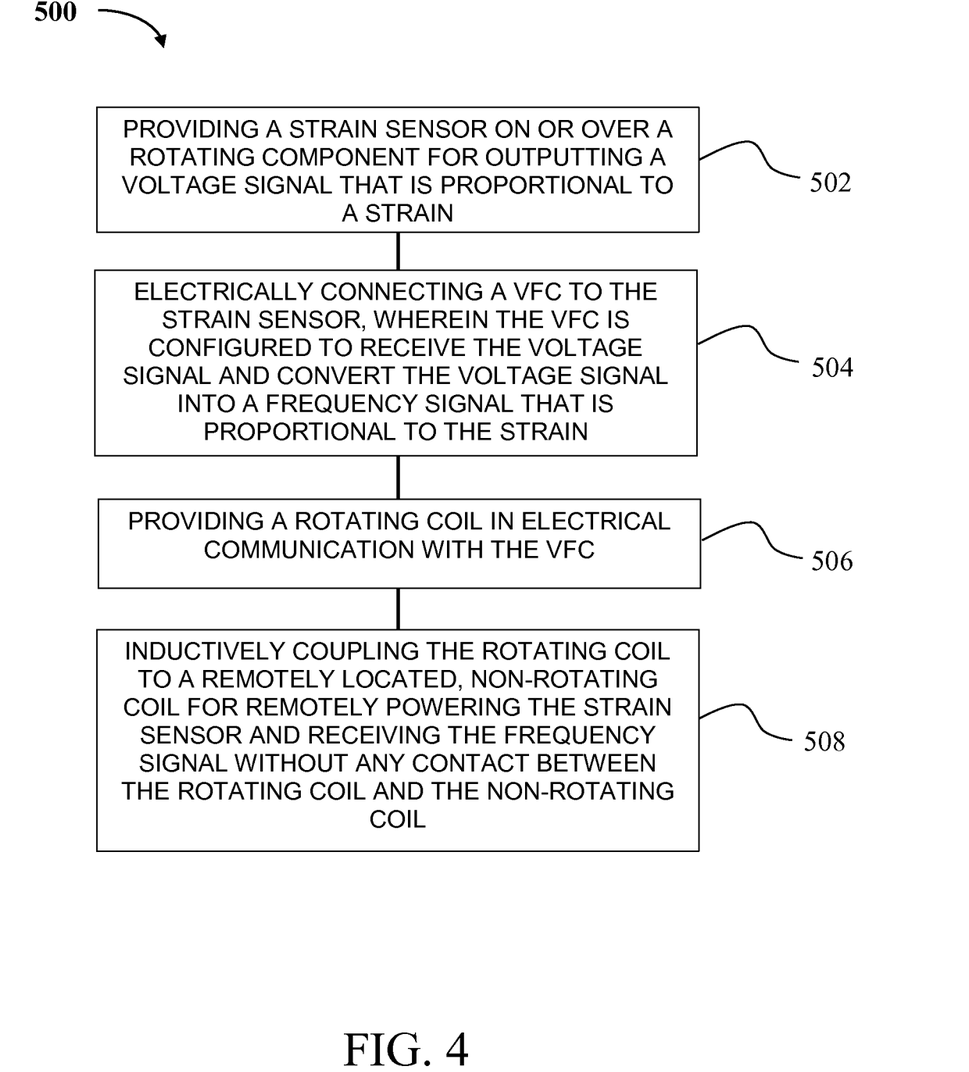
FIG. 4 is a process flow diagram of an exemplary method of providing and/or utilizing torque measurement systems and/or devices according to one embodiment of the subject matter described herein.

FIG. 4 is a process flow diagram of an exemplary method 500 of providing and/or utilizing torque measurement devices and systems according to one embodiment of the subject matter described herein. In block 502, a strain sensor is provided. The strain sensor may include a strain gage or strain bridge (e.g., 202, FIG. 1), such as a Wheatstone bridge or a strain gauge rosette. The strain sensor is provided on or over a rotating component for outputting a voltage signal that is proportional to a strain.

In block 504, a VFC is electrically connected to the strain sensor. The VFC (e.g., 208, FIG. 1) is configured to receive the voltage signal from the strain sensor, and convert the voltage signal into a frequency signal that is proportional to the strain.

In block 506, a rotating coil is provided. The rotating coil is electrically connected to the VFC.

In block 508, the rotating coil is inductively coupled to a remotely located, non-rotating coil for remotely powering the strain sensor and receiving frequency signals transmitted from the rotating coil. There is no physical or mechanical contact between the rotating coil and the non-rotating coil.

Devices, systems, and methods herein may be used to sense, detect, monitor and/or measure torque associated with any rotating component, shaft, or system, not limited to aircraft components; aircraft engines; helicopter components; rotor components; tail rotor components; drive shaft components; structural components (e.g., components of buildings, dams, bridges, etc.); biomedical implants; engines; jet engines; propeller engines; turbines; rotating shafts; shakers; conveyors; fan shafts; ammunition feed systems; fitness equipment, etc. Devices, systems, and methods herein may be deployed in any personal, industrial, commercial, aerospace, aeronautical, and/or defense application including rotating components.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. A torque measurement system (100) for measuring torque on a rotating structure ($S_1$), the system (100) comprising:
    a non-rotating electronic component (300), the non-rotating electronic component (300) including a controlled clock source (308);
    a rotating electronics (200), the rotating electronic (200) including:
        a strain sensor (202) configured to output a voltage signal that is proportional to a strain, wherein the strain sensor (202) is positioned to detect a strain in the rotating structure ($S_1$);
        a Voltage to Frequency Converter (VFC) (208) in electrical communication with the strain sensor (202), wherein the VFC (208) is configured to receive the voltage signal and convert the voltage signal into a frequency signal that is proportional to the strain, wherein the VFC (208) is configured to receive precise timing information from the controlled clock source (308); and
        a coil ($C_1$) in electrical communication with the VFC (208), wherein the coil ($C_1$) is inductively coupled to the remotely located non-rotating electrical component (300), and wherein the coil ($C_1$) is configured to power the strain sensor (202) via power received from the non-rotating electrical component (300) and transmit the frequency signal to the non-rotating electrical component (300) without physically contacting the non-rotating electrical component (300).

2. The system (100) according to claim 1, wherein the strain sensor (202) comprises a strain gauge rosette or a Wheatstone bridge.

3. The system (100) according to claim 1, wherein the strain sensor (202) is disposed on or over the rotating structure ($S_1$) and is configured to measure a torque associated with the rotating structure ($S_1$) that is rotating at between 9,000 and 12,000 Revolutions Per Minute (RPM), or between 5,000 and 10,000 G-forces (Gs), or operating at a temperature between −55° C. and 125° C., and convert the torque into an electrical signal.

4. The system (100) according to claim 3, wherein the rotating structure ($S_1$) that is rotating comprises an aircraft component, a helicopter component, an engine component, a rotor, a shaft, or a turbine component.

5. The system (100) according to claim 1, wherein the torque measurement system (100) is operable at least 5,000 G-forces (Gs).

6. The system (100) according to claim 1, wherein the torque measurement system (100) is devoid of software or firmware.

7. The system (100) according to claim 1, wherein the rotating electronics (200) is disposed on or over the rotating structure ($S_1$), and wherein the torque measurement system (100) is operable over the entire rotation of the rotating structure ($S_1$) enabling measurements at zero (0) Revolutions Per Minute (RPM) and at any rotational position independent of a rotation rate.

8. The system (100) according to claim 1, further comprising an onboard shunt calibrator (204) electrically connected to the strain sensor (202) for calibrating the strain sensor (202).

9. The system (100) according to claim 1, further comprising an amplifier (206) electrically connected to the strain sensor (202) for amplifying the voltage signal that is output from the strain sensor (202).

10. The system (100) according to claim 1, wherein the non-rotating electrical component (300) includes a power supply (304) for remotely powering the strain sensor (202) and the VFC (208).

11. The system (100) according to claim 1, wherein the torque measurement system (100) further comprises a measurement bandwidth of approximately 50 kHz or more.

12. The system (100) according to claim 1, wherein the torque measurement system (100) is operable at a range of temperatures between approximately −55° C. and 125° C.

13. The system (100) according to claim 1, further comprising a housing (202A) disposed over the strain sensor (202).

14. The system (100) according to claim 1, wherein the coil ($C_1$) comprises a rotating receiver coil that is configured to receive power and signal coupling throughout an entire 360° of rotation.

15. A torque measurement system (100) for measuring torque on a rotating structure ($S_1$), the system (100) comprising:
   rotating electronics (200) including:
      at least one strain sensor (202) for measuring a strain, wherein the strain sensor (202) is positioned to detect a strain in the rotating structure ($S_1$); and
      a Voltage to Frequency Converter (VFC) (208) configured to output a frequency signal that is proportional to the measured strain; and
   non-rotating electronics (300) that are remotely located from the rotating electronics (200), the non-rotating electronics (300) being configured to remotely power and interrogate the rotating electronics (200) via near field and switched reactance communications;
   wherein the rotating electronics (200) and the non-rotating electronics (300) are configured to communicate analog information without batteries or a physical connection therebetween.

16. The torque measurement system (100) according to claim 15, wherein the sensor (202) comprises a strain gauge rosette or a Wheatstone bridge.

17. The torque measurement system (100) according to claim 15, wherein the non-rotating electronics (300) further comprise a Frequency to Voltage Converter (FVC) (306) configured to receive the frequency signal from the VCF (208) and convert the frequency signal into a torque.

18. The torque measurement system (100) according to claim 15, wherein the torque measurement system (100) is devoid of software or firmware.

19. The torque measurement system (100) according to claim 15, wherein the strain sensor (202) is disposed on or over the rotating structure ($S_1$) and is configured to measure a torque associated with a structure that is rotating at between 9,000 and 12,000 Revolutions Per Minute (RPM), or between 5,000 and 10,000 G-forces (Gs), or operating at a temperature between −55° C. and 125° C., and convert the torque into an electrical signal.

20. The torque measurement system (100) according to claim 15, wherein the torque measurement system (100) is operable at least 5,000 G-forces (Gs).

21. The torque measurement system (100) according to claim 15, wherein the rotating electronics (200) further comprise an onboard calibrator (204) for calibrating the strain sensor (202).

22. The torque measurement system (100) according to claim 15, wherein the non-rotating electronics (300) comprise a controlled clock source (308).

23. The torque measurement system (100) according to claim 15, wherein the VFC (208) comprises a clock recovery and power supply.

24. The torque measurement system (100) according to claim 15, wherein the torque measurement system (100) comprises a measurement bandwidth of approximately 50 kHz or more.

25. The torque measurement system (100) according to claim 15, wherein the torque measurement system (100) is operable at a range of temperatures between approximately −55° C. and 125° C.

26. The torque measurement system (100) according to claim 15, further comprising a low profile housing (202A) disposed over portions of the rotating electronics (200).

27. The torque measurement system (100) according to claim 15, wherein the rotating electronics (200) further comprise a rotating receiver coil ($C_1$) that is configured to receive power and VFC signal coupling throughout an entire 360° of rotation.

28. The torque measurement system (100) according to claim 15, wherein the torque measurement system (100) is configured to measuring torque associated with an aircraft component, a helicopter component, a rotor, a shaft, an engine component, or a turbine component.

29. A torque measurement system (100) for measuring torque on a rotating structure ($S_1$), the system (100) comprising:
   rotating electronics (200) including:
      at least one strain sensor (202) for measuring a strain, wherein the strain sensor (202) is positioned to detect a strain in the rotating structure ($S_1$); and
      a Voltage to Frequency Converter (VFC) (208) configured to output a frequency signal that is proportional to the measured strain; and
   non-rotating electronics (300) that are remotely located from the rotating electronics (200), the non-rotating electronics (300) being configured to remotely power and interrogate the rotating electronics (200) via near field and switched reactance communications, wherein the non-rotating electronics (300) comprise a controlled clock source (308);
   wherein the rotating electronics (200) and the non-rotating electronics (300) are configured to communicate analog information without batteries or a physical connection therebetween.

* * * * *